(12) United States Patent
Partyka

(10) Patent No.: US 6,466,138 B1
(45) Date of Patent: *Oct. 15, 2002

(54) MESHED TELEMETRY SYSTEM USING FREQUENCY HOPPING FOR INTERMITTENT TRANSMISSION

(76) Inventor: Andrzej Partyka, 370 Finch La., Bedminster, NJ (US) 07921

( * ) Notice: Subject to any disclaimer, the term of this patent is extended or adjusted under 35 U.S.C. 154(b) by 0 days.

This patent is subject to a terminal disclaimer.

(21) Appl. No.: 09/483,817

(22) Filed: Jan. 15, 2000

Related U.S. Application Data

(63) Continuation-in-part of application No. 08/931,089, filed on Sep. 15, 1997, now Pat. No. 6,058,137.

(51) Int. Cl.$^7$ ............................................. G08C 19/04
(52) U.S. Cl. ............................ 340/870.11; 340/870.07; 375/132
(58) Field of Search ................... 340/870.02, 870.07, 340/870.11; 375/132, 136

(56) References Cited

U.S. PATENT DOCUMENTS

| | | | |
|---|---|---|---|
| 4,040,054 A | 8/1977 | Overman | |
| 4,435,821 A | 3/1984 | Ito et al. | |
| 4,606,041 A | 8/1986 | Kadin | |
| 4,612,652 A | 9/1986 | Kadin | |
| 4,614,945 A | 9/1986 | Brunius et al. | |
| 4,653,068 A | 3/1987 | Kadin | |
| 4,843,638 A | 6/1989 | Walters | |
| 5,079,768 A | 1/1992 | Flammer | |
| 5,121,407 A | 6/1992 | Partyka et al. | |
| 5,204,855 A | 4/1993 | Bebee et al. | |
| 5,390,166 A | 2/1995 | Rohani et al. | |
| 5,400,246 A | 3/1995 | Wilson et al. | |
| 5,408,506 A | 4/1995 | Mincher et al. | |
| 5,428,602 A | 6/1995 | Kemppainen | |
| 5,428,637 A | 6/1995 | Oliva et al. | |
| 5,438,329 A | 8/1995 | Gasouniotis et al. | |
| 5,517,187 A | 5/1996 | Bruwer et al. | |
| 5,532,702 A | * 7/1996 | Mintz .......................... 342/463 |
| 5,546,422 A | 8/1996 | Yokev et al. | |
| 5,548,582 A | 8/1996 | Brajal et al. | |
| 5,610,907 A | 3/1997 | Barret | |
| 5,659,303 A | 8/1997 | Adair, Jr. | |
| 5,748,100 A | 5/1998 | Gutman et al. | |
| 5,956,621 A | 9/1999 | Weiss et al. | |
| 6,058,137 A | 5/2000 | Partyka | |

OTHER PUBLICATIONS

Robert C. Dixon, "Spread Spectrum Systems", Johm Wiley & Sons,1984 ISBN 0–471–88309–3, pp.: 52–54, 217–235.
Marvin K. Simon, et al., "Spread Spectrum Communications", Computer Science Press, 1885. ISBN 0–88175–017–4, vol. 1, pp. 352–358, vol. 3, pp. 386–398.
Don J. Torrieri, "Principles of Secure Communication Systems", Artech House 1985, ISBN 0–89006–139–4. pp. 212–215, 132, 148–150, 134–145, 92–97.
Kamilo Feher, "Digital Communications: microwave applications", Prentice–Hall Inc, 1981, ISBN 0–13–214080–2. pp. 155, 156–161, 163–165.

* cited by examiner

Primary Examiner—Timothy Edwards, Jr.

(57) ABSTRACT

A plurality of cooperative telemetry systems is disclosed in which each telemetry system comprises a plurality of remote telemetry transmitters to intermittently transmit short duration messages indicative of the status of sensors associated with the remote telemetry transmitters and at least one telemetry collection unit including a radio transceiver. Each telemetry collection unit forms a node in a wireless network in which telemetry collection units cooperate with each other in order to increase reliability and lower the average cost of each telemetry system. Such network can communicate with a remote central monitoring station via one or more network interface units connected to a private or public wired or wireless network.

28 Claims, 10 Drawing Sheets

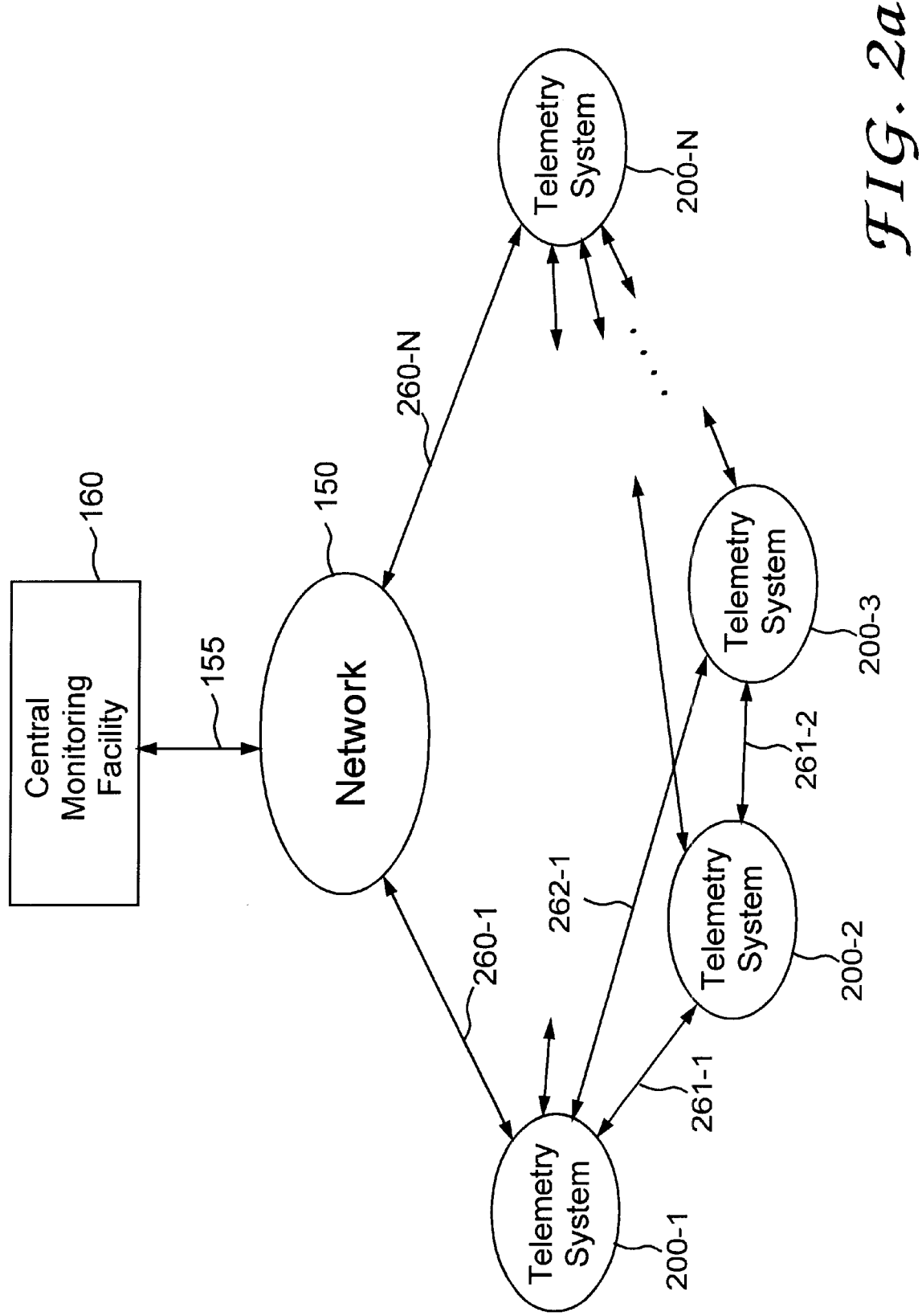

MESHED TELEMETRY SYSTEM USING FREQUENCY HOPPING FOR INTERMITTENT TRANSMISSION

CROSS-REFERENCE TO RELATED APPLICATIONS

This is a Continuation-in-part of application Ser. No. 08/931,089, filed Sep. 15, 1997, now U.S. Pat. No. 6,058,137, entitled "FREQUENCY HOPPING SYSTEM FOR INTERMITTENT TRANSMISSION" which application is incorporated by reference.

FIELD OF THE INVENTION

The present invention relates to telemetry in general and, more particularly, to a plurality of cooperating telemetry systems.

BACKGROUND OF THE INVENTION

In certain types of radio systems there exist many battery operated transmitters that periodically transmit short duration messages to one or more receivers. One example of such systems are telemetry systems, another example is burglary and fire alarm systems that can also be viewed as a specific telemetry system. In these systems, many transmitters located at different places transmit messages indicative of the status of monitoring sensors to a telemetry receiving station (e.g., a receiver with a processor that collects the data from the sensors, etc.). Usually the transmitters include a battery status and sometimes also the temperature in the transmitted messages in addition to the monitored sensor status. Normally, the transmitters transmit supervisory status messages that are as short as feasible and the period between the transmissions is as long as feasible in order to minimize the average current drain from the battery. In addition, short and infrequent transmissions lower the probability that the data is lost due to collisions which occur when two or more transmitters transmit at the same time. However, when an alarm or an abnormal condition occurs, a transmitter transmits immediately in order to convey the alarm message with little delay.

In order to identify the sensors, each associated transmitter is numbered and identified by a transmitter identification number (identification) number. Usually, such a system has one telemetry receiving station that receives data from the transmitters. Typically, the telemetry receiving station has to convey unusual system status to a central monitoring facility that collects data from several systems that are often placed in different geographical locations.

SUMMARY OF THE INVENTION

The illustrative embodiment of the present invention comprises a plurality of telemetry systems where each system comprises several remote telemetry transmitters to intermittently transmit short duration messages indicative of the status of the sensors associated with the transmitters, and at least one telemetry collection unit having a radio transceiver. In an illustrative embodiment of the present invention, the telemetry collection units forward alarm messages received from other telemetry collection units and respond to messages from remote telemetry transmitters associated with other telemetry collection units. In effect, the telemetry collection units and the associated remote telemetry transmitters form a meshed wireless telemetry system in which telemetry collection units cooperate with each other in order to increase reliability and lower the cost of each system. Such meshed telemetry system can communicate with a remote central monitoring station via one or more network interface units connected to a private or public wired or wireless network. In an illustrative embodiment, the network interface unit is wireless equipment that connects to one telemetry collection unit. In accordance with an illustrative embodiment, there are fewer wireless network interface units than there are telemetry collection units in the meshed system, thus, in a meshed system, the cost of the wireless network interface unit can be shared between several telemetry systems. However, in an alternative embodiment the network interface unit is a wireline modem, and there may be one modem for each telemetry system.

In accordance with an illustrative embodiment, the telemetry system has the telemetry collection unit receiver augmented by a transmitter circuitry thus rendering it to become a system transceiver. Such a modification is simple and inexpensive since the transmitter can share most of its circuits with receiver. For example the transmitter control can be accomplished by the same logic circuit or microprocessor as the receiver. Also some of the radio frequency circuits such as the synthesizer and reference frequency can be reused.

In accordance with an illustrative embodiment, the telemetry collection unit receives messages from the remote telemetry transmitters that are associated with this telemetry collection unit and it is responsive to the received messages. In addition, the telemetry collection unit receives and is responsive to the messages transmitted by remote telemetry transmitters associated with other telemetry collection units. In an illustrative embodiment, the telemetry collection unit has the identification numbers of the transmitters associated with this telemetry collection unit. In addition, in the illustrative embodiment, in operation, the telemetry collection unit is furnished with identification numbers of remote telemetry transmitters that are associated with other telemetry collection units and that are to be monitored by this telemetry collection unit. In the illustrative embodiment, such furnishing is accomplished by exchanging information and cooperation with the other telemetry collection units.

In an illustrative embodiment, the telemetry collection units from different systems communicate with each other and exchange information to obtain mutual coverage of their respective transmitters. In operation, telemetry collection units of two systems establish communications with each other and exchange information about the remote telemetry transmitters that belong to each system. This may include transmitter identification and signal quality of the received messages. Based on the exchanged information, the telemetry collection units can agree to receive and be responsive to the messages received from the remote telemetry transmitters that belong to the other system.

In accordance with an illustrative embodiment, the telemetry collection units from different systems communicate with each other and exchange information in order to pass along alarm (or other) messages until they reach a terminating node, i e. a wired or wireless network interface unit or a telemetry collection unit that is coupled to or equipped with a wired or wireless network interface unit. In accordance with an illustrative embodiment there are fewer network interface units than there are telemetry collection units, thus making it possible to share one network interface unit between several systems. However, in an alternative illustrative embodiment there is one network interface unit for each telemetry system. E.g. in a burglary alarm application, each system is equipped with a wireline modem that is vulnerable to an attack by cutting the phone line. In such case, the telemetry collection unit of the system under attack can sent an alarm information to a central monitoring facility by communicating with another telemetry collection unit that belongs to another system. This way reliability is improved without an expense of a wireless interface unit.

In accordance with an illustrative embodiment, in operation, the telemetry collection unit (receiver) receives messages from the various remote telemetry transmitters, some of which may require that the central monitoring facility be notified. When such a message is received, the telemetry collection unit transmits a message that is directed to a telemetry collection unit from other system. Ordinarily, this is the nearest telemetry collection unit. Upon reception and confirmation, the message is passed along in a similar way to the next telemetry collection unit. If the confirmation is not received, the message may be retransmitted a predetermined number of times. Similarly, the message is passed from one telemetry collection unit to the next until it reaches the final destination that is: a wired or wireless network interface unit or a telemetry collection unit coupled to or equipped with a wired or wireless network interface unit. In effect, the telemetry collection units form nodes in a network through which the messages are routed from the source to the destination,i.e. the terminating node. At any point along the way the message is routed, the path selected by a telemetry collection unit can be altered as needed, e.g. if the nearest telemetry collection unit is not operative, an alternative route can be selected. Preferably, the alternative paths are selected on the basis of the signal quality and distance to the terminating node, wherein the signal quality is measured along the entire selected path to maximize the transmission reliability.

Similarly, in accordance with an illustrative embodiment messages are carried in reverse direction; i e. from network interface unit to a telemetry collection unit.

In accordance with an illustrative embodiment, in some cases it may be preferable that the messages are broadcasted (rebroadcasted) instead of routed. In such a case, the originating node broadcasts the first message, then each telemetry collection unit that received the message retransmits (rebroadcasts) the message, thus making it possible for the message to reach many nodes of the system. In a way, the message floods the network thus ensuring that at least one terminating node receives the message. The message may be rebroadcasted by each node a predetermined number of times, or alternatively, rebroadcasting stops when the confirmation message is received from the terminating node.

Similarly, in accordance with an illustrative embodiment messages are carried in reverse direction; i.e. from network interface unit to a telemetry collection unit.

In accordance with an illustrative embodiment, each remote telemetry transmitter transmits short duration messages at predetermined time intervals in such a way that each transmitter transmits each consecutive message at a different frequency. For each remote telemetry transmitter, the frequency variations are selected according to a sequence, and the sequence is determined individually for each transmitter based on the transmitter identification number. The frequency sequences are orthogonal, a coincidence of frequencies at one time excludes the coincidence at any other time for the duration of the entire sequence. This way, the possibility is eliminated that two or more remote telemetry transmitters interfere with each other during more than one message transmission for the duration of the entire sequence. In addition, transmission at varied, i e. diverse, frequencies reduces probability that all transmitted messages are lost due to interference or signal fading that are predominantly frequency selective.

Alternatively, in accordance with an illustrative embodiment, each remote telemetry transmitter can vary the time between transmissions—TBT—according to a predetermined pattern. Preferably, for each remote telemetry transmitter, the pattern of variations depends on the transmitter identification number. This way, the possibility is eliminated that two or more remote telemetry transmitters interfere with each other during more than one message transmission for the duration of the entire sequence.

In accordance with another illustrative embodiment, the remote telemetry transmitters vary both the frequency and time between transmissions in order to maximize the system reliability. In this way, the receiver is relived from the burden to receive more than one message at different frequencies at the same time. Thus, the receiver circuit complexity is reduced. Preferably, the frequency-time sequences are orthogonal.

In accordance with an illustrative embodiment, the transmitters in the telemetry collection units perform similar periodic transmissions and frequency and time variations as the remote telemetry transmitters as described above.

BRIEF DESCRIPTION OF THE DRAWINGS

FIG. 2a is a block diagram of plurality of telemetry systems in accordance with the illustrative embodiment of the present invention.

DETAILED DESCRIPTION

Figure 1A:
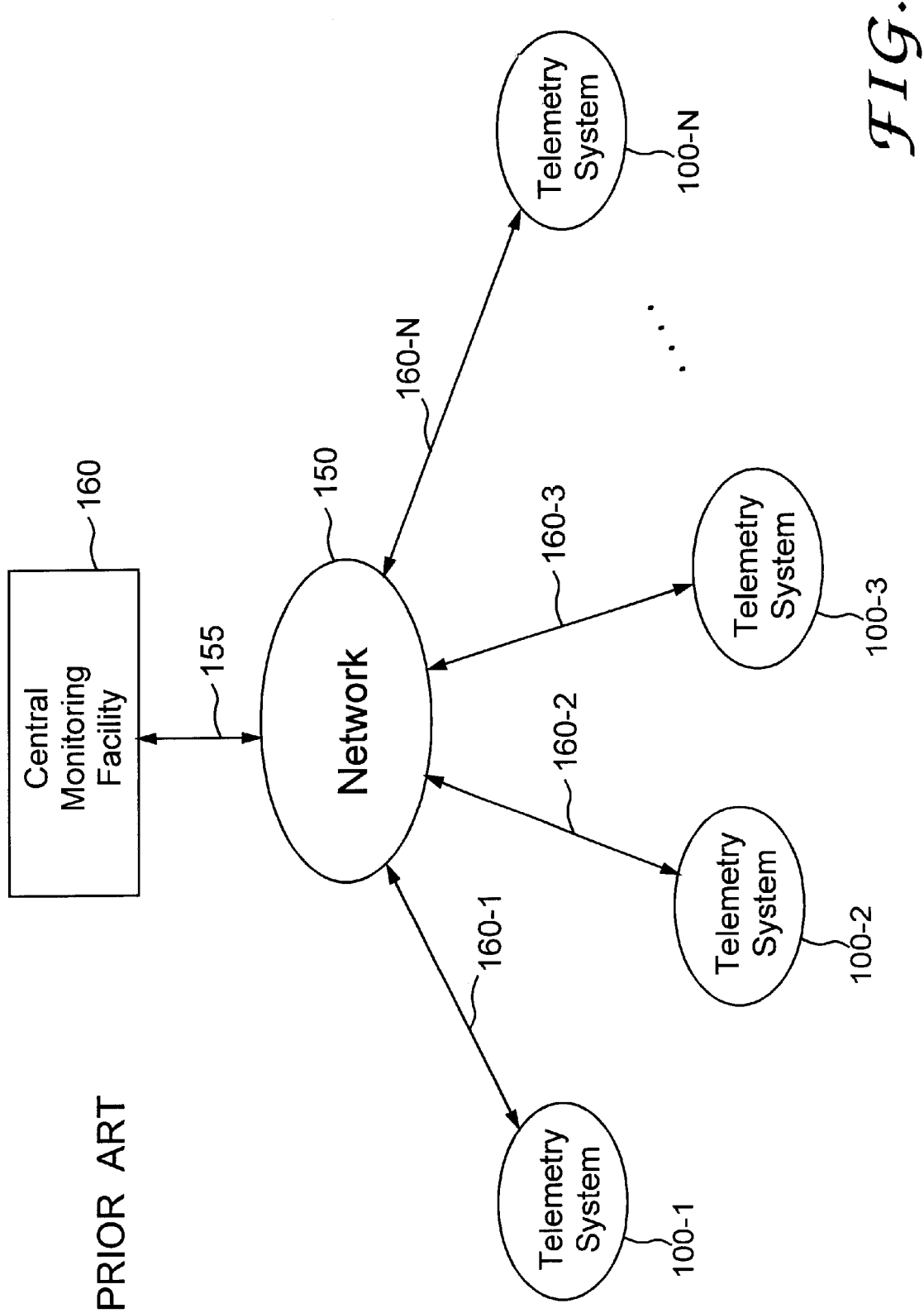
FIG. 1a is a block diagram of a plurality of telemetry systems in the prior art.

FIG. 1a depicts a plurality of illustrative telemetry systems in the prior art. Each of the telemetry systems 100-1, 100-2, 100-3, etc, to 100-N interfaces independently with a central monitoring facility 160 over a telecommunications network 150. Each of the telemetry systems and the central monitoring facility are, typically, located in different geographical locations.

Figure 1B:
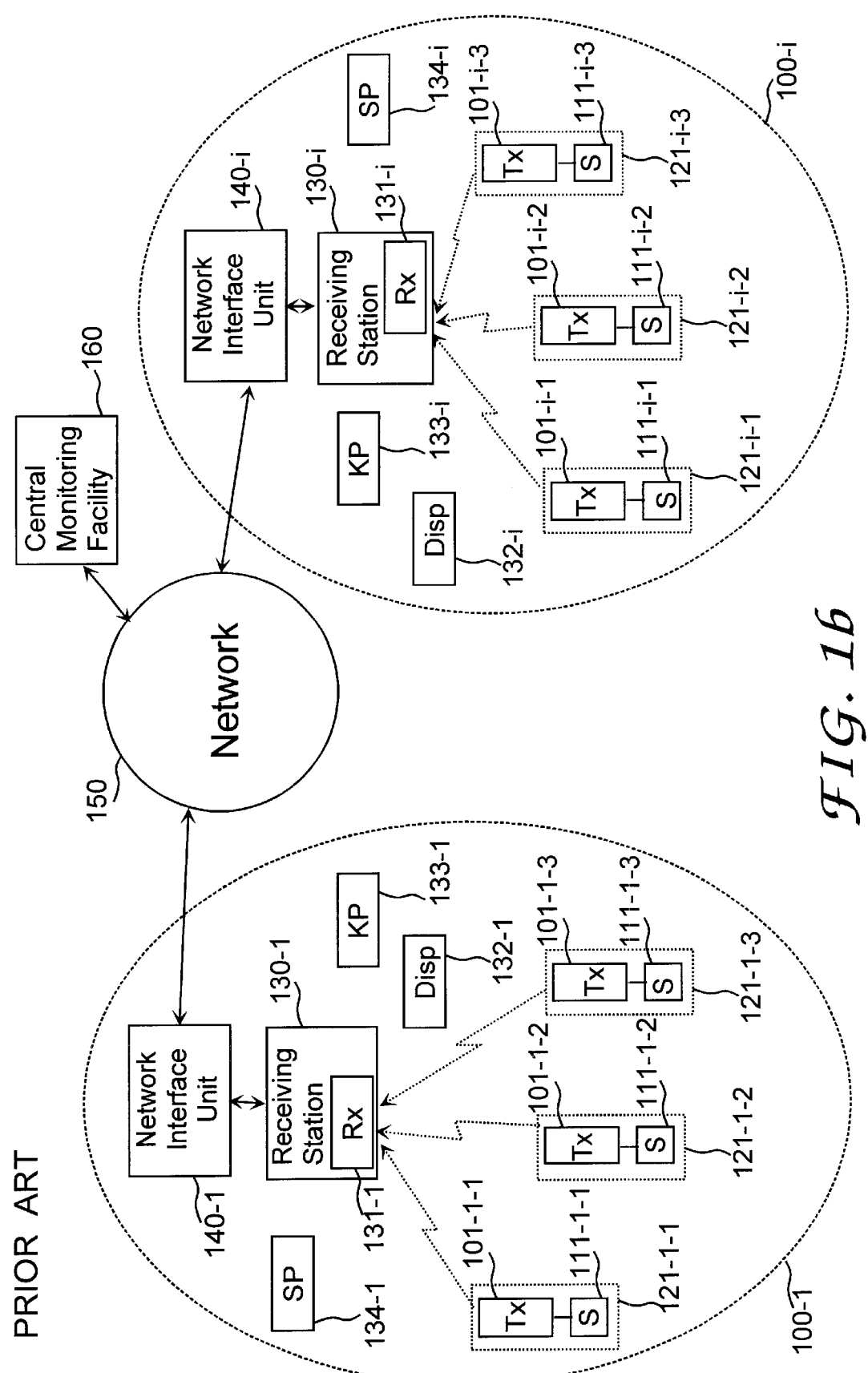
FIG. 1b is a block diagram of two illustrative telemetry systems in the prior art.

FIG. 1b depicts two illustrative telemetry systems in the prior art, telemetry system 100-1 and telemetry system 100-i, that are both monitored by central monitoring facility 160. Telemetry system 100-1 comprises:

(i) one or more remote telemetry transmitters (e.g., remote telemetry transmitters 121-1-1, 121-1-2, and 121-3, etc.) comprising radio transmitters 101-1-1, 101-1-2, and 101-1-3, etc. that are each fed information by an associated sensor (e.g., monitoring sensors 111-1-1, 111-1-2, and 111-1-3, etc.);

(ii) telemetry receiving station 130-1, which comprises a radio receiver (e.g., radio receiver 131-1, etc.) that receives the telemetry transmitted by the remote telemetry transmitters; and (iii) one or more keypads 133-1 for enabling a user to enter commands into telemetry receiving station 130-1, (iv) one or more displays 132-1 for providing information to a user from telemetry receiving station 130-1;

(v) an electro-acoustic transducer (e.g., a loudspeaker, a bell, etc.) 134-1 for alerting a user of an alarm; and (vi) network interface unit 140-1 that enables telemetry, commands, and other signals to pass between telemetry receiving station 130-1 and central monitoring facility 160, via network 150 (e.g., the public switched telephone network, the Internet, etc.). The composition of telemetry system 100-i is analogous to that of telemetry system 100-1. Telemetry receiving station 130-1 advantageously has associated with it: (1) one or more keypads for local command entry, (2) one or more displays for providing information, and (3) an electro-acoustic transducer (e.g., a loudspeaker, a bell, etc.) for alerting a user of an alarm.

In operation, each remote telemetry transmitter periodically or sporadically transmits telemetry to its associated telemetry receiving station, which telemetry typically comprises: sensor status, battery status, temperature, message number, etc. When a remote telemetry transmitter indicates that its associated sensor detects an alarm condition, the telemetry receiving station communicates that fact to network interface unit 140-1, which, in turn, forwards that information to the central monitoring facility 160. Conversely, central monitoring facility 160 can initiate communications with the telemetry receiving stations to: (i) learn the status of the remote telemetry transmitters or the telemetry receiving station, and (ii) to change the telemetry receiving station state such as the alarm thresholds for the monitored sensors.

In accordance with FIG. 1b, telemetry system 100-1 and telemetry system 100-i operate independently (i.e., the telemetry receiving station of one telemetry system is not responsive to the telemetry transmitted by the remote telemetry transmitters that are associated with another telemetry system). Furthermore, both telemetry system 100-1 and telemetry system 100-i have their own network interface unit with which to communicate with the central monitoring facility.

Typically, the cost of a network interface unit far exceeds the cost of the telemetry receiving station, which increases the overall cost of the telemetry system significantly. Furthermore, when a wireline connection to network 150 is used, an additional problem arises if there is no wireline access where the telemetry receiving station is to be located. Although a wireless network interface unit solution might solve access problems, such units tend to be expensive.

The reliability of telemetry systems 100-1 and 100-i is also in issue. For example, the failure of the network interface unit or the telephone line between the network interface unit and network 150 renders the telemetry system useless. Furthermore, even a failure of a telemetry receiving station renders the system useless.

FIG. 2a depicts a block diagram of a plurality of telemetry systems according to an illustrative embodiment of the present invention. Each of the telemetry systems and the central monitoring facility are, typically, located in different geographical locations, although they may be in sufficient proximity such that a telemetry system can communicate with some of its neighbors. Each of the telemetry systems 200-1, 200-2, 200-3, etc, to 200-N can communicate with a central monitoring facility 160 over a telecommunications network 150. However, the communications is accomplished via indirect routs using other telemetry systems as nodes in a network. Only selected telemetry systems are equipped with network interface units. Each telemetry system can communicate with at least one other telemetry system. Thus, for each telemetry system, there exists at last one path to reach one or more network interface units. In an advantageous implementation, there exist at least two alternative paths that do no not include a node common for both paths.

Figure 2B:
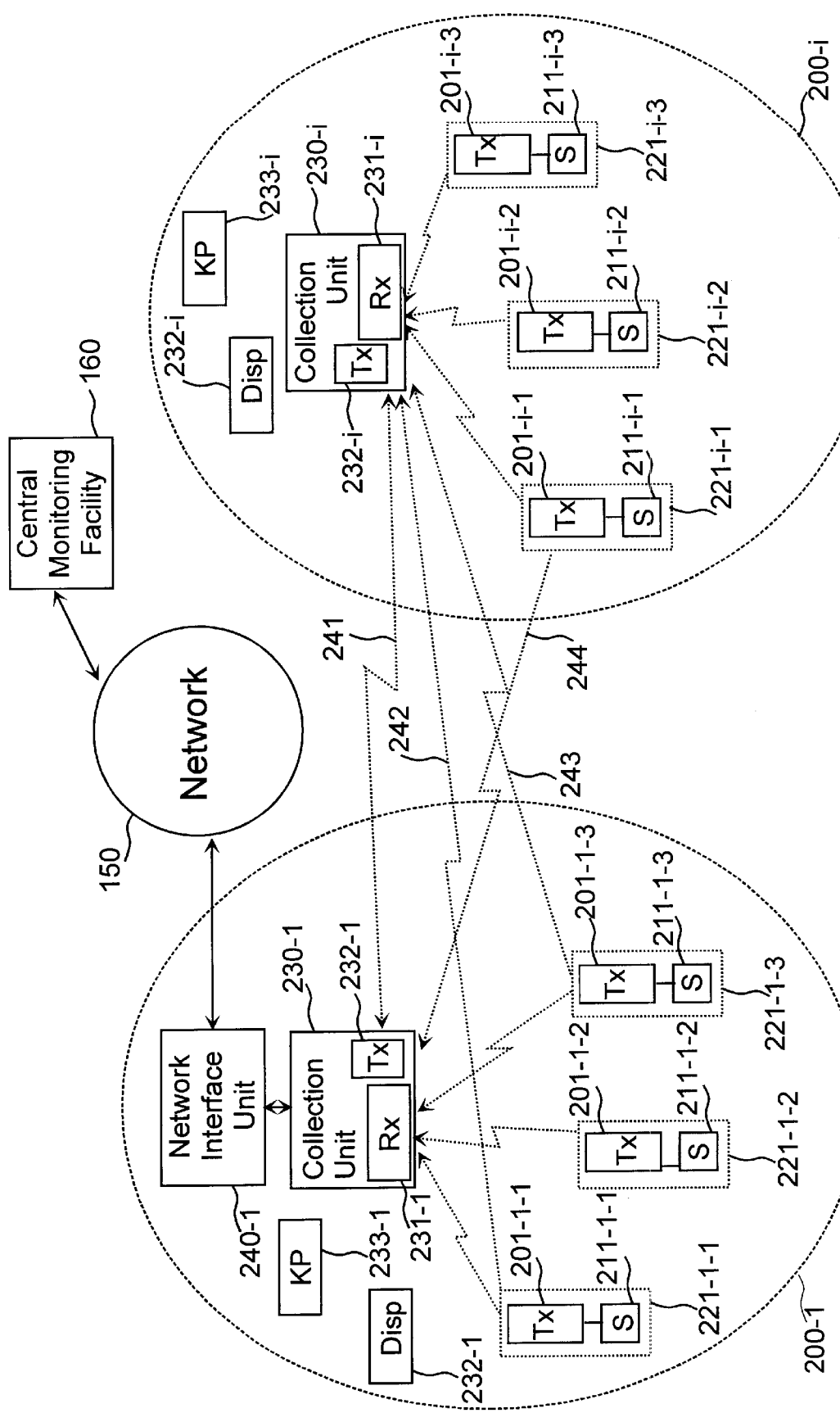
FIG. 2b is a block diagram of an illustrative embodiment of the present invention.

FIG. 2b depicts a block diagram of the illustrative embodiment of the present invention, which comprises: telemetry system 200-1, telemetry system 200-i, network 150 and central monitoring station 160. Telemetry system 200-1 comprises:

(i) one or more remote telemetry transmitters (e.g., remote telemetry transmitters 221-1-1, 221-1-2, and 221-3, etc.) comprising radio transmitters 201-1-1, 201-1-2, and 201-1-3, etc. that are each fed information by an associated sensor (e.g., monitoring sensors 211-1-1, 211-1-2, and 211-1-3, etc.);

(ii) telemetry collection unit 230-1, which comprises a radio transmitter 232-1, a radio receiver (e.g., radio receiver 231-1, etc.) that receives the telemetry transmitted by remote telemetry transmitters 221-1, 222-1, and 223-1, at least one of the remote telemetry transmitters associated with telemetry system 200-i, and messages from telemetry collection unit 230-i; and (iii) one or more keypads 233-1 for enabling a user to enter commands into telemetry collection unit 230-1, (iv) one or more displays 232-1 for providing information to a user from telemetry collection unit 230-1;

(v) an electro-acoustic transducer (e.g., a loudspeaker, a bell, etc.) for alerting a user of an alarm; and (vi) network interface unit 240-1 that enables telemetry, commands, and other signals to pass between telemetry collection unit 230-1 and central monitoring facility 160, via network 150 (e.g., the public switched telephone network, the Internet, etc.).

The composition of telemetry system 200-i is analogous to that of telemetry system 200-1 except that it does not comprise a network interface.

Although the network interface unit 240-1 is shown as a separate entity, it is to be understood that in some applications, such network interface unit can be an integral part of the telemetry collection unit 230-1. In any event it can be said that the telemetry collection unit is operatively coupled to the network interface unit.

Although only two telemetry systems are depicted in FIG. 2b, some embodiments of the present invention will have two or more telemetry systems that cooperate and communicate amongst themselves. In the illustrative embodiment of the present invention, each of telemetry collection unit 230-1 and telemetry collection unit 230-i can establish peer-to-peer communications and exchange information about their respective systems.

For example, when the telemetry collection unit 200-1 receives telemetry from one or more remote telemetry transmitters associated with telemetry system 200-i that indicate an alarm condition, telemetry collection unit 200-1 can confer with telemetry collection unit 200-i on whether telemetry collection unit 200-1 should send an alarm to central monitoring facility 160 via network interface unit 240. The fact that the telemetry collection units can communicate with each other enables proximate telemetry systems to share one or more network interface units, which drops the average cost of a telemetry system. Alternatively, each telemetry system can be equipped with a less reliable network interface unit (e.g. wireline modem). The communications between the telemetry collection units increases reliability, since an alarm can be transmitted to a central monitoring facility even if the wireline is cut-off from one the telemetry systems.

In addition, each remote telemetry transmitter has a unique identification number associated with it, and the information exchanged between the telemetry collection units includes the identification numbers of their associated remote telemetry transmitters. For example, telemetry collection unit 230-1 informs telemetry collection unit 230-i of the identification numbers of the remote telemetry transmitters associated with telemetry system 200-1, and vice versa. Therefore, if two or more telemetry collection units are in proximity and the signal quality of the telemetry from the other's remote telemetry transmitters is satisfactory, then the telemetry collection units can agree to mutually monitor the telemetry from their aggregate remote telemetry transmitters.

In operation, each remote telemetry transmitter intermittently transmits short telemetry messages that advantageously comprise: information indicative of sensor status (e.g. switch closure status), battery status, temperature, etc.

Each telemetry collection unit monitors all the remote telemetry transmitters that belong to the same system as well as the remote telemetry transmitters that belong to other systems with which the telemetry collection unit has an agreement for a mutual coverage. When a telemetry collection unit receives an alarm message from a remote telemetry transmitter that belongs to another system, the telemetry collection unit is responsive to that message by first communicating with the telemetry collection unit in the originating system. When the telemetry collection unit in the originating system is not operative, the telemetry collection unit establishes communications and sends appropriate information to the central monitoring facility via the network interface unit. If the telemetry collection unit is not connected to a wireless network interface unit, it passes an appropriate information to another telemetry collection unit. It should be apparent that this way the system is not vulnerable to a failure or intentional destruction of any single telemetry collection unit. In effect, the quality and reliability of all the systems is improved and expense is lowered.

Figure 2C:
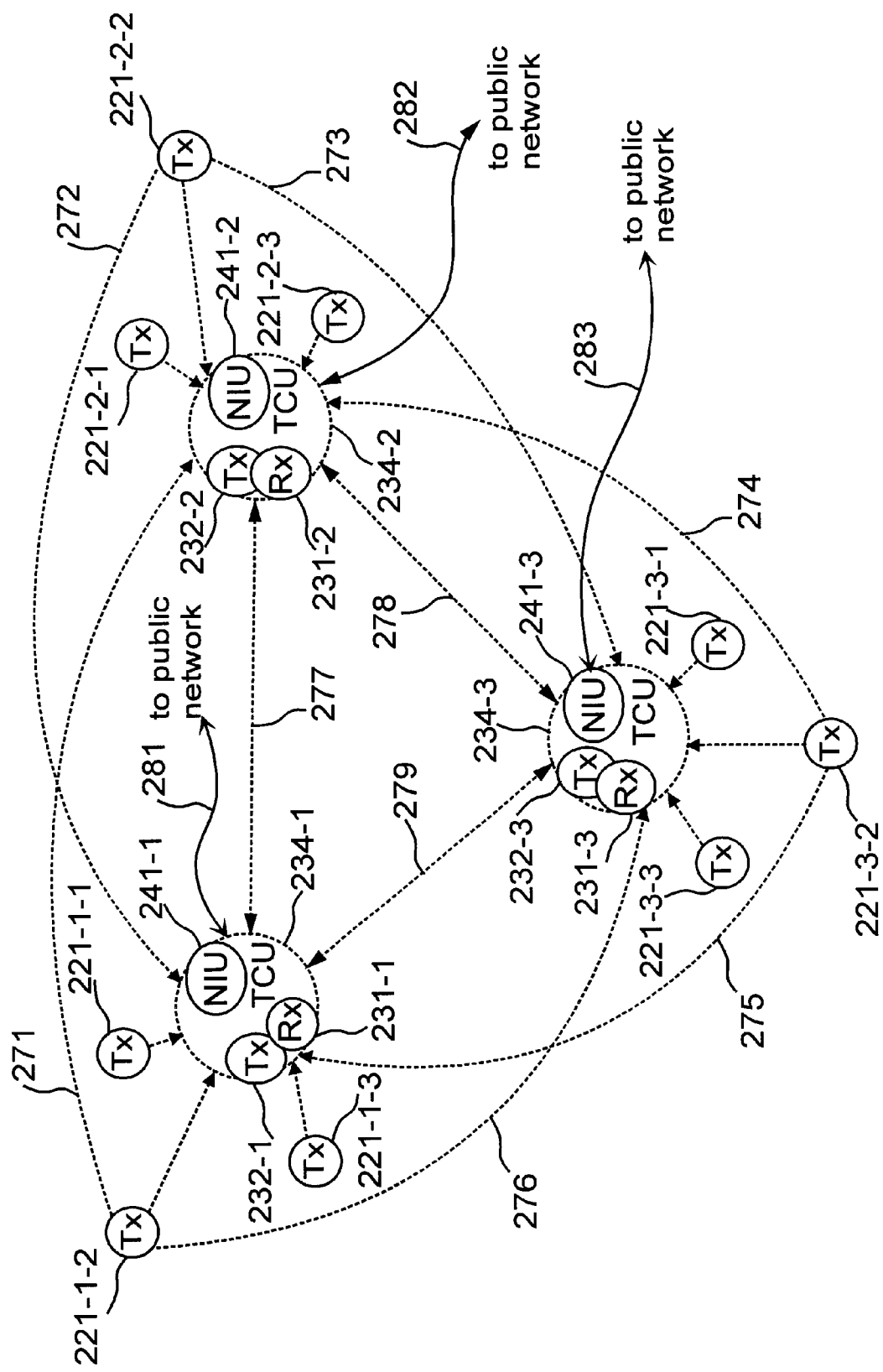
FIG. 2c is a block diagram of another illustrative embodiment of the present invention.

FIG. 2c illustrates another exemplary embodiment of the present invention that comprises: telemetry collection unit 234-1 with associated remote telemetry transmitters 221-1-1, 221-1-2, 221-1-3, telemetry collection unit 234-2 with associated remote telemetry transmitters 221-2-1, 221-2-2, 221-2-3, and telemetry collection unit 234-3 with associated remote telemetry transmitters 221-3-1, 221-3-2, and 221-3-3. Each telemetry collection unit comprises a receiver 231-1, 231-2, and 231-3 respectively, a transmitter 232-1, 232-2, and 232-3 respectively. In addition, each telemetry collection unit comprises embedded modem that serves as a network interface unit 241-1, 241-2, and 241-3 respectively.

In operation, each telemetry collection unit receives telemetry from its associated remote telemetry transmitters and, in addition, from some remote telemetry transmitters that are associated with other telemetry collection units, e.g. over paths 271 to 276.

In operation, the telemetry collection units communicate via wireless paths 277, 278 and 279 respectively to exchange identification codes of the associated remote telemetry transmitters and to communicate alarms that originate in the remote telemetry transmitters.

It should be apparent that if a network interface unit or even a telemetry collection unit is inoperative or cut-off from the public network, an alarm can be detected by another telemetry collection unit and sent over the public network to a central monitoring facility. Also, if the phone line is cut-off, the telemetry collection unit can detect the condition and immediately send a warning message to the central monitoring facility. Thus, using a low cost wireline modems, the system can provide high reliability and immunity from an attack by an intentional cutting off the telephone line.

In the advantageous embodiment, in operation, the telemetry collection units manage passing the alarm messages and communications with the central monitoring facility in a coordinated way.

Figure 3:
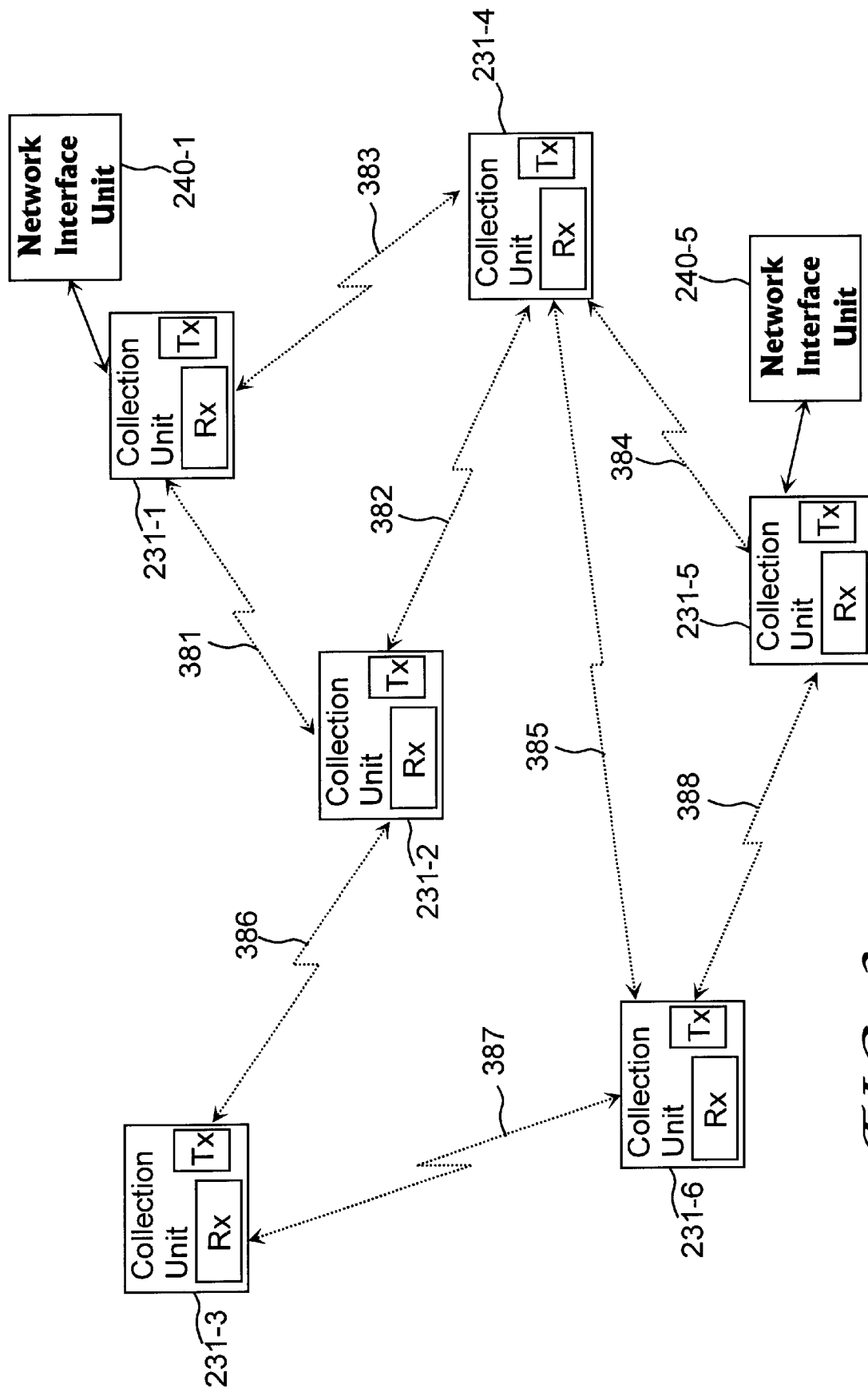
FIG. 3 is a diagram of a plurality of telemetry systems working as a network.

Referring to FIG. 3, several telemetry systems constitute a network of systems. In FIG. 3, the systems are represented by their telemetry collection units: 231-1, 231-2, 231-3, 231-4, 231-5, and 231-6. In some systems,i.e. 231-1 and 231-5 the telemetry collection units are connected with network interface units 240-1 and 240-5. Depending on the proximity and radio propagation conditions, the telemetry collection units can communicate with each other over the radio paths 381, 382, 383, 384, 385, 386 and 387. For example, in FIG. 3, telemetry collection units 231-3 can communicate with telemetry collection units 231-2 and 231-6; telemetry collection unit 231-6 can communicate with telemetry collection units 231-3, 231-4, and 231-5; telemetry collection unit 231-5 can communicate with telemetry collection units 231-6 and 231-4, etc. It is apparent, that each telemetry collection unit can communicate with one or more other telemetry collection units but not all other telemetry collection units.

In operation, a telemetry collection unit that receives an alarm message from a remote telemetry transmitter that belongs to the same system originates and transmits an alarm message. The alarm message is preferably directed (addressed) to another (neighboring) telemetry collection unit. The neighboring telemetry collection unit retransmits the received alarm message directing it to another telemetry collection unit. The process is repeated until the message is passed to a telemetry collection unit that interfaces to a network interface unit. Such telemetry collection unit is a terminating telemetry collection unit because it does not pass along the message to another telemetry collection unit. Instead, the terminating telemetry collection unit sends appropriate information to the central monitoring facility via the network interface unit. In order to facilitate orderly retransmission of the alarm message by various telemetry collection units (nodes of the network), the telemetry collection units route the message according to a predetermined algorithm and according to a routing table that contains information about the number of hops and relative signal quality along the chosen message path. The number of hops indicates the number of retransmissions needed to reach the terminating telemetry collection unit, and the relative signal quality is a composite quality along the entire message path determining likelihood for successful message travel along the chosen path. For example, the telemetry collection unit 231-3 has a table with two entries related to two possible paths beginning with telemetry collection units 231-2 and 231-6. The number of hops and the signal quality is determined as the best of the possible paths. For example, the telemetry collection unit 231-2 can transmit the alarm message to the terminating node 231-1 directly or via node 231-4. To compute the information for the path along telemetry collection unit 231-2 for the table of the telemetry collection units 231-3, the best of the two paths from the telemetry collection units 231-2 to a terminating source is taken. Similarly, the telemetry collection unit 231-6 can send the alarm message to the terminating node 231-5 directly or via node 231-4. Again the best path information is taken to compute the path along telemetry collection unit 231-6 for the table of the telemetry collection units 231-3.

In the advantageous embodiment, in order to collect the necessary information in the system nodes, the terminating telemetry collection units periodically transmit predetermined short duration messages or probes. The probes are retransmitted by each network node. Each retransmitted probe contains the number of hops the message traveled so far and the composite signal quality. At each node this information is updated before retransmission. The probe messages also contain the identification number of the last retransmitting node. Each node collects the statistics of the received probes and their path information. By way of comparison and elimination, the path quality is established for all paths at each node. In operation, if the best path is not operative, e.g. when the neighboring telemetry collection unit is malfunctioning, an alternative path can be selected at each node of the network. Thus, the message that leaves the originating node is always ensured to reach the terminating node. The path information update may require some time and may also require significant network traffic if the probes are sent often. Therefore, the compromise is required which may result in some tables to be momentarily outdated. In some situations when the highest priority alarm messages are to be sent, a simpler but more robust algorithm is preferred.

Accordingly, in the advantageous embodiment, the originating node broadcasts the priority alarm message instead of directing it to a specific node. Each node that successfully receives the priority alarm message rebroadcasts the message. The rebroadcasting is continued by each new node that receives the priority alarm message. In effect, the message "floods" the entire network to eventually reach one or more terminating nodes. Each terminating node upon reception of the priority alarm message, independently informs the central monitoring facility via its modem or wireless network interface unit. Each node rebroadcasts the priority alarm message a predetermined number of times or until a confirmation message is received from a terminating node that received the broadcasted priority alarm message and successfully informed the monitoring facility. The confirmation message is propagated through the nodes of the network in a way similar to the priority alarm message. I.e., the terminating node brodcasts the confirmation a predetermined number of times and each node that received the message rebroadcasts the message a predetermined number of times. In order to make the process of rebroadcasting orderly, each priority alarm message has an identification number that identifies the message. Preferably, this is the identification number of the originating remote telemetry transmitter augmented with an identification of the telemetry collection unit and a time stamp. Each node that receives the priority alarm message stores the message identification for a predetermined time during which all alarm message with the same identification are ignored. Thus, the process of rebroadcasting terminates after each node rebroadcasts the message a predetermined number of times.

It should be apparent that the same methods of transmission (i.e. routed or broadcasted) can be used to carry messages in the opposite direction, i.e. from a network interface unit to a selected telemetry collection unit. Such messages may be sent when a central monitoring facility needs to inquire about the status of a selected telemetry collection unit.

It should now be apparent that the combined features of the mutual coverage of the remote telemetry transmitters of two or more telemetry collection units and the capability of the telemetry collection units to act in a specific way as nodes of a network which can carry alarm messages across, makes the telemetry system more reliable, more functional and less expensive.

In the advantageous embodiment, all remote telemetry transmitters transmit periodically short duration messages at predetermined time intervals. The transmission time for each remote telemetry transmitter is not coordinated between different remote telemetry transmitters. Consequently, sometimes the messages from different remote telemetry transmitters may happen to coincide and interfere with each other. To mitigate this effect, in the preferred embodiment, each remote telemetry transmitter varies the transmission frequency for each consecutive message. The frequency variations are large enough so that messages can be separately received at different frequencies without interference. The frequency variations are done individually for each remote telemetry transmitter according to predetermined patterns that are, preferably, based on the transmitter identification number as described later in details.

Preferably all sequences are orthogonal. I.e. for any two transmitters, a coincidence of frequencies at one time excludes the coincidence at any other time for the duration of the entire sequence. This way, the possibility is eliminated that two or more transmitters interfere with each other during more than one message transmission for the duration of the entire sequence. In addition, transmission at varied (i.e. diverse) frequencies reduces probability that all transmitted messages are lost due to interference or signal fading that are predominantly frequency selective.

Alternatively, each remote telemetry transmitter varies the time between transmission—TBT—according to a predetermined pattern. Preferably, for each remote telemetry transmitter, the pattern of variations depends on the transmitter identification number. This way, the possibility is eliminated that two or more transmitters interfere with each other during more than one message transmission for the duration of the entire sequence.

In the advantageous embodiment, the remote telemetry transmitters vary both the frequency and time between transmissions in order to maximize the system reliability. One advantage of the additional (time) variation is that, this way, the receiver is relived from the burden to receive more than one message at different frequencies at the same time. Such a need could arise if two remote telemetry transmitters transmit at the same time (albeit at different frequencies). Thus, the receiver circuit complexity is reduced and the system reliability is improved.

Figure 4:
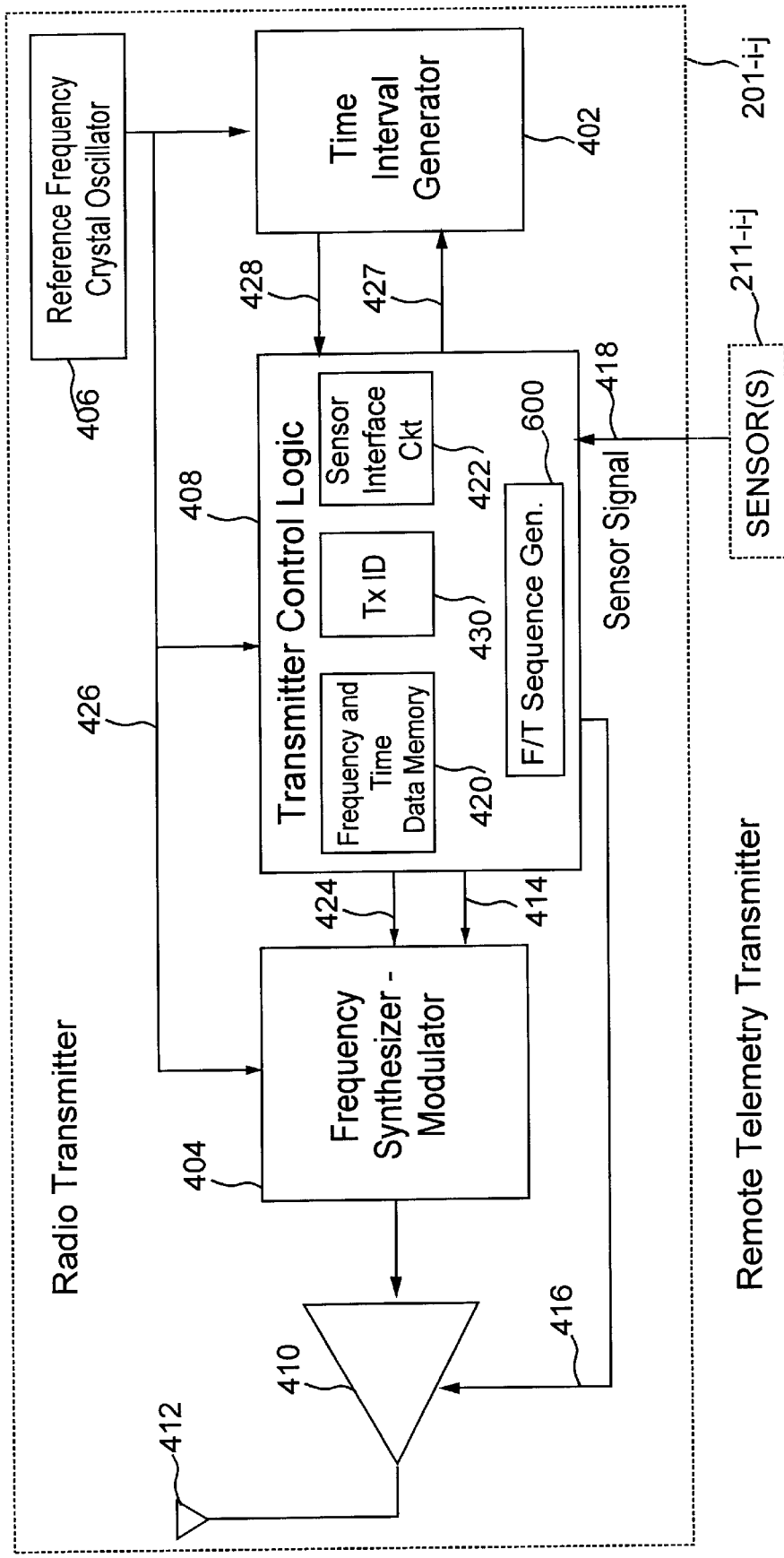
FIG. 4 is a diagram of the preferred remote telemetry transmitter implementation.

Referring to FIG. 4, in accordance with an illustrative embodiment of the present invention, the remote telemetry transmitter 221-$i$-$j$ includes a radio transmitter (transmitter) 210-$i$-$j$ including a reference frequency crystal oscillator 406 to produce a stable frequency on line 426, a time interval generator 402 establishing a time base to produce pulses on line 428 activating the transmitter, a frequency synthesizer-modulator 404 to produce a radio frequency carrier modulated by modulation data fed to the synthesizer via line 424 wherein the frequency of the carrier is programmed to a desired value via plurality of lines 414, transmitter control logic 408 to activate and program the synthesizer-modulator 404 via plurality of lines 414 when the logic is activated by a pulse from the time interval generator or by an abnormal signal indication on a sensor signal input line 418, an amplifier 410 to amplify the radio carrier provided by the synthesizer when the amplifier is activated by the control logic 408 via line 416, and an antenna 412 to radiate the power delivered by the amplifier. The control logic 408 includes a frequency and time data memory register 420 to hold information used to determine the time and the frequency of next transmission, and a sensor interface circuit 422 to accept the sensor signal and detect an abnormal signal condition, and to convert the sensor signal to a digital format suitable for transmission. The transmitter logic also includes a storage means 430 to store a transmitter identification number to differentiate this transmitter from other transmitters. The transmitter control logic, in some systems, can be realized based on a microprocessor, in some other systems, a specialized component may be used. In an illustrative implementation, the remote telemetry transmitter includes also one or more sensors 211-$i$-$j$ responsive to changes that are to be monitored and to produce appropriate signals at the interface 418.

In operation, during the time between transmissions, the transmitter is in a standby mode in which the amplifier 410 and synthesizer-modulator 404 are not active and, preferably, the control signals turn off the power from these circuits in order to minimize the standby current of the transmitter. The transmitter control logic 408 is in a standby mode in which most of the circuits are inactive and some or most of the circuitry can be powered down with the exception of the circuits supporting critical functions; (a) the sensor interface circuit 422 that detects an abnormal signal condition and produces a binary signal that is logically combined with the signal 428 produced by the time interval generator so that when either a pulse or abnormal condition occurs the rest of the transmit logic circuitry is activated or powered up, (b) the frequency and time data memory 420 that has to retain the data during the period between transmission and consequently either it has to be a nonvolatile type or it has to be powered up during the period between transmissions. Upon activation, the control logic 408 determines the activation source by reading signals 428 and 418.

When the logic 408 is activated by a pulse 428 from the time interval generator the following sequence of events occurs. First, the logic reads the frequency data memory and produces a data packet that includes the sensor status, the transmitter identification number and other data such as battery status. Then, the logic activates and programs the synthesizer-modulator 404, activates the amplifier 410 and sends the packet to the modulator via line 424. After completion of each transmission, the transmitter logic sets the transmitter in the standby mode until activated again by a pulse on line 428 or a sensor abnormal condition indicated on line 418.

In an advantageous embodiment the transmission of a packet can be repeated a predetermined number of times at separate frequencies, wherein the number of repetitions is chosen according to application needs and, wherein the frequencies are determined by the transmitter logic according to an algorithm described later in details. This way, it is possible for the receiver to receive some repeated packets even if other packets are lost due to frequency selective fading caused by multipath or due to interference.

When a sensor abnormal condition occurs, the sensor interface circuit 422 produces an active level of the signal indicative of the sensor abnormal level which activates the transmitter via a combinatorial logic circuit that combines the sensor abnormal level signal with the pulses from the time interval generator. When activated this way, the transmitter control logic 408 produces a data packet that includes the sensor status, then the logic activates and programs the synthesizer-modulator 404, activates the amplifier 410, and sends the packet to the synthesizer-modulator. In an advantageous embodiment, the transmission of the alarm packet is repeated a predetermined number of times using a plurality of predetermined alarm frequencies in such a way that the transmission frequency is changed after each single packet transmission according to a predetermined fixed sequence. The essence of the idea is that the alarm message being infrequent can afford a much greater transmission overhead and can be repeated several times. In some applications, the transmissions of alarm packets are advantageously performed at "transmission opportunities" in accordance with a method described later in details.

After the transmission sequence is completed, the control logic disables the signal indicative of the sensor abnormal status so that an abnormal sensor status can not activate the control logic. Then, the control logic puts the transmitter in the standby mode until activated by a pulse from the time interval generator. When subsequently activated, the transmitter control logic performs the usual transmission sequence but the data packets include information that the sensor condition is abnormal if the condition persists. When the abnormal condition subsides, the signal indicative of an abnormal status is enabled so that a subsequent occurrence of an abnormal condition can activate the logic and trigger a new alarm transmission sequence; thus, normal operation is restored.

In an advantageous embodiment, the sequence in which these frequencies are used is determined individually for each transmitter. The following is the description how this is accomplished in the advantageous embodiment. Each transmitter includes a pseudo random sequence generator, wherein a pseudo random sequence generator is based on a linear feedback shift register, wherein some outputs of the shift register are fed back to an EX-OR (Exclusive OR) gate whose output is connected to the register input. For a certain combination of the outputs that are fed to the EX-OR gate, the shift register can produce a sequence that has $2^N-1$ bits, wherein N is the length of the shift register. Such a sequence is called a maximum length sequence. Alternatively, if all the outputs of the shift register are taken at a time, then a pseudo random sequence of $2^N-1$ numbers is created, wherein all the numbers are N digits long and each number differs from all the other numbers in the sequence; the numbers range from 1 to $2^N-1$. Such pseudo random generators are known to the skilled in the art. For example, a three-bit PN generator is based on a three-bit shift register with feedback taken from the first and the last bit. This register produces a sequence of seven numbers, wherein each number has three digits. The numbers change from 1 to 7.

Figure 6:
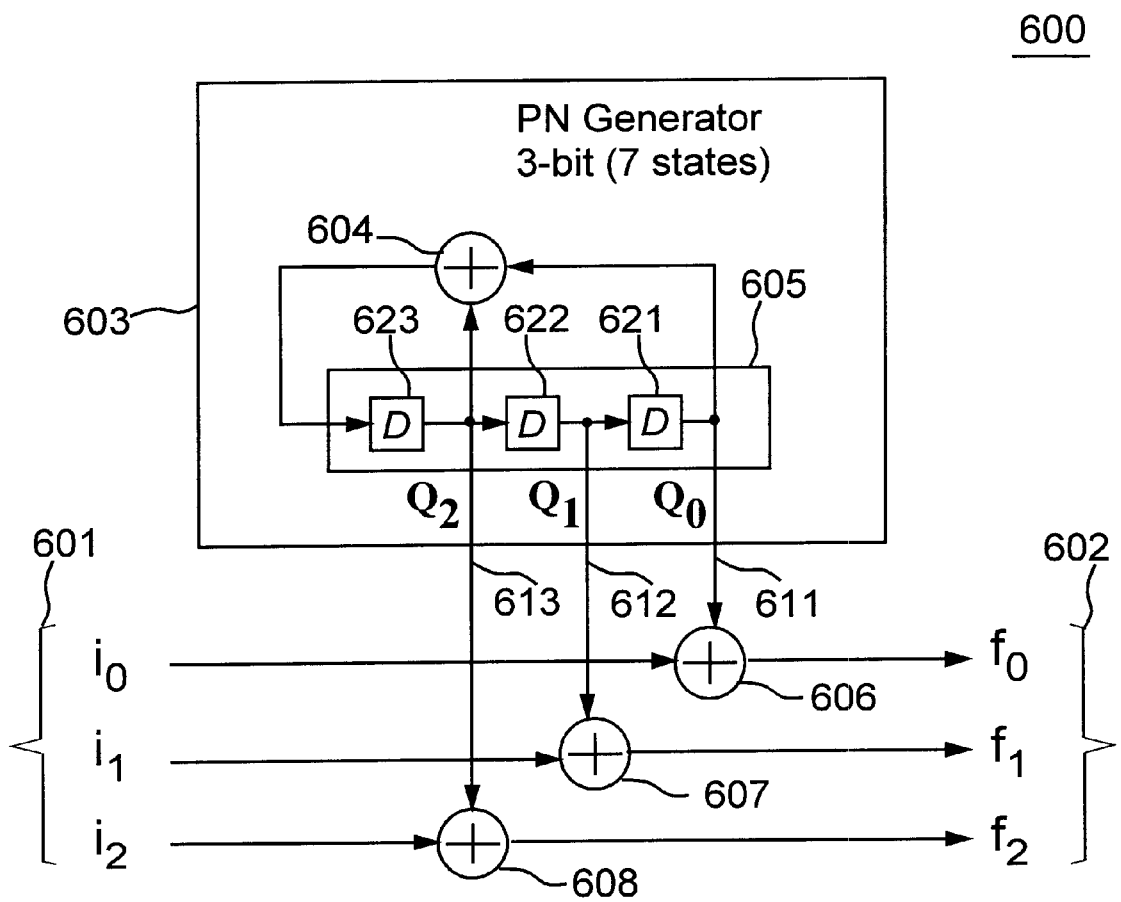
FIG. 6 is a diagram of the PN generator used to affect the frequency and time changes in the preferred remote telemetry transmitters and in the telemetry collection units.

Referring to FIG. 6, the pseudo random sequence generator 603 consists of a shift register 605 and EX-OR gate 604. The shift register 605 is composed of three stages 621, 622, and 623 having three outputs $Q_0$ 611, $Q_1$ 612 and $Q_2$ 613 respectively. The feedback is taken from outputs $Q_0$ and $Q_2$. The three least significant bits of the transmitter identification $\{i_2, i_1, i_0\}$ 601 are combined with the output of the pseudo random sequence generator {$Q_2$, $Q_1$, $Q_0$} using EX-OR gates 608, 607, 606. The result can be used to indicate the frequency or frequency channel index {$f_2, f_1, f_0$} 602 over which the transmission will occur.

Assuming that the initial state of the shift register is binary 111 (decimal 7), the produced sequence is {7, 3, 5, 2, 1, 4, 6}. These numbers are then combined with the last three bits of the transmitter identification using bit by bit EX-OR operation; i.e. the last bit of the transmitter identification ($i_0$) is combined with the last bit of the random number ($Q_0$), etc. This way produced new sequence has numbers ranging from 0 to 7 the order of which depends on the last three bits of the transmitter identification. Thus, 8 distinct (permutated) sequences of numbers are created. These sequences are used to select the transmission frequencies. For example, if the last digits of the transmitter identification are 000, then the frequencies are selected in the order 7, 3, 5, 2, 1, 4, 6,i.e. the sequence is not altered. If the last three digits of the transmitter identification are 001, then the frequencies are selected in the order 6, 2, 4, 3, 0, 5, 7; if the last three digits of the transmitter identification are 010, then the frequencies are selected in the order 5, 1, 7, 0, 3, 6, 4; etc. If longer shift register is used, longer sequences are generated using more frequencies. In the preferred embodiment, an 8-bit shift is used to produce sequences that use 256 frequencies. Each number in the sequence represents an index based on which the actual frequency is determined.

Similarly, according to an exemplary implementation, the time between the transmissions is randomized using the transmitter bits. Advantageously, the transmitter bits used for time randomization are different from the bits used for the time randomization. However, advantageously, the same PN generator outputs are utilized, thus making it easier to synchronize the receiver with the time variations.

In determining the time between the transmissions, the produced indexes are used to determine the increments or decrements of the nominal time between the transmissions. Advantageously, according to an exemplary implementation, the transmitter control logic 408 (FIG. 4) programs the time interval generator via lines 427 in order to change the timer period accordingly.

The receiver of the telemetry collection unit has to synchronize and track the timing and frequency of each monitored remote telemetry transmitter.

Figure 5:
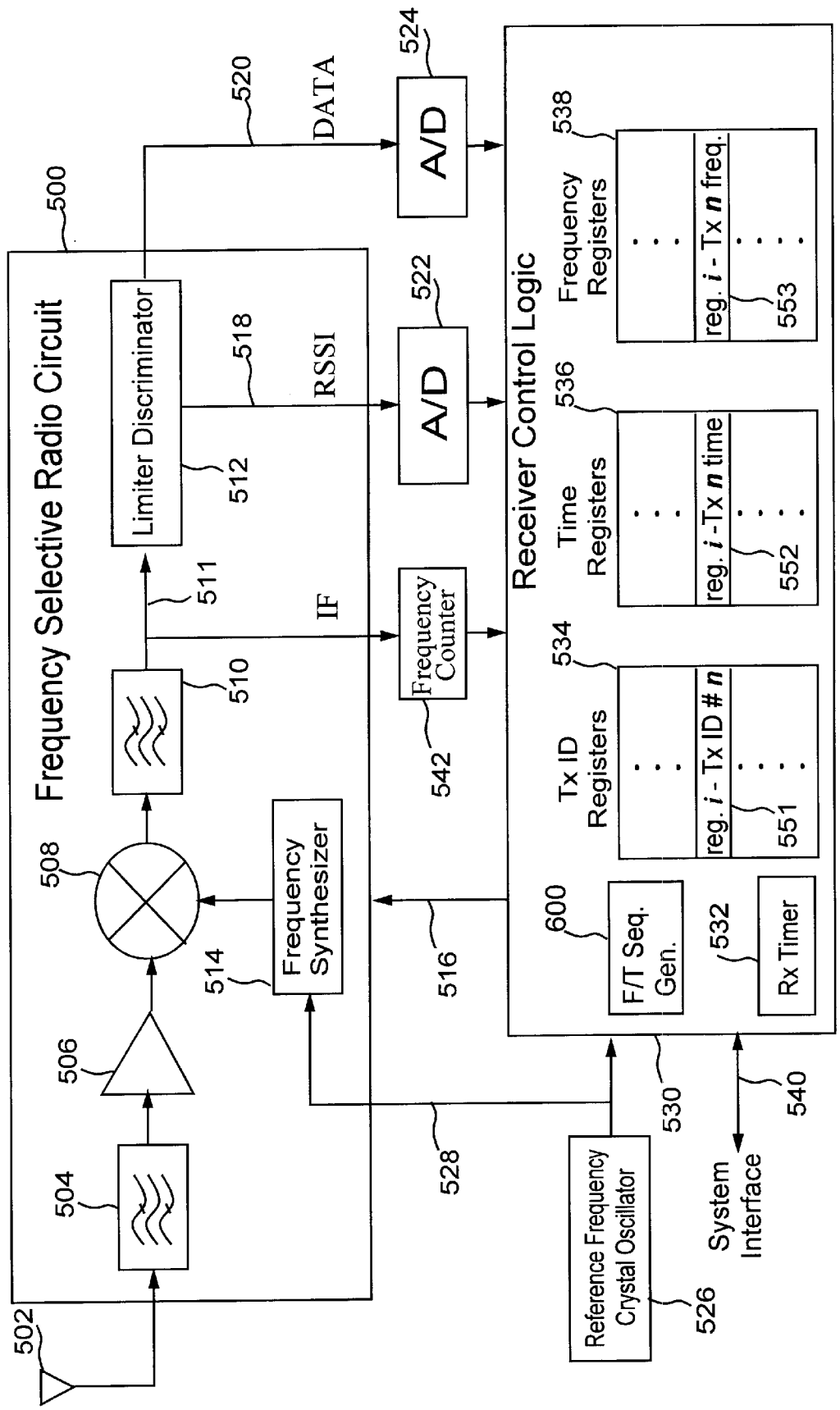
FIG. 5 is a diagram of the preferred receiver implementation.

Referring to FIG. 5, the receiver includes a reference frequency crystal oscillator 526 to produce a stable reference frequency on line 528 for the receiver circuits, a frequency selective radio receiver circuit 500 whose frequency is programmable via lines 516, to receive and demodulate a frequency modulated carrier when the frequency of the frequency selective receiver circuit is programmed according to the frequency of the carrier, and a receiver control logic means 530 to process demodulated data, to provide system interface lines 540, responsive to the received data, and to program the frequency of the frequency selective receiver circuit. The control logic includes a receiver timer 532 establishing a time base to measure the elapsing time. The control logic also includes: (a) a plurality of identification memory registers 534 to hold digital data indicative of identification numbers for each remote telemetry transmitter that belongs to the system, (b) a plurality of time memory registers 536 to hold digital data indicative of the time of the next transmission occurrence for each respective remote telemetry transmitter, and (c) a plurality of frequency memory registers 538 to hold digital data indicative of the frequency of the next transmission occurrence for each respective remote telemetry transmitter. In the illustrative embodiment, the registers are organized such that if an arbitrary register i 551 of the plurality of identification memory register 534 contains a transmitter identification number n, then register i 552 of the plurality of time memory registers 536, and register i 553 of the plurality of frequency memory registers 538 are also associated with the same transmitter whose identification number is n. The frequency selective radio receiver circuit 500 includes a RF band-pass filter 504, an amplifier 506, an IF band-pass filter 510, a mixer 508, limiter-discriminator circuit 512 and frequency synthesizer 514. The RF band-pass filter selects only the desired frequency band allocated for the transmission, the mixer mixes the incoming signal with the signal produced in the frequency synthesizer and produces an IF frequency (Intermediate Frequency). The IF frequency is filtered in a narrow band filter 510 whose bandwidth is selected according to the channel bandwidth. The limiter discriminator demodulates the signal and produces base-band DATA signal 520 and an RSSI signal 518 indicative of the received signal strength. The DATA signal 520 and the RSSI signal 518 are converted to binary signals by A/D converters 524 and 522 respectively and fed to the control logic 530. The presented architecture of the frequency selective radio receiver circuit 500 is known as a super-heterodyne FM receiver; it is well known and it does not require additional explanation. The transmitted message data is extracted from the DATA signal 520 digitized by the A/D converter 524 using one of the many well-known methods for signal processing and does not require additional explanation.

In the advantageous embodiment, the frequency registers 538 hold for each transmitter the state of PN generator. If the synchronization is obtained with a given transmitter, the state of the PN generator is identical with that in the transmitter.

In the advantageous embodiment, the time registers 536 hold numbers—time of next transmission—for each transmitter representing the state of the receiver timer 532 at the time the next transmission is due from a transmitter.

In operation, the receiver control logic 530 sequentially compares the data content of the time registers 536 with the data content of the receiver timer 532 and if the transmission is due from a remote telemetry transmitter n whose time data is stored in register i 552, the control logic programs the frequency selective radio receiver circuit 500 according to the content of the frequency register i 553 and the identification register i 551 that are associated with the same transmitter n, attempts to decode the demodulated signal, changes the content of the time register based on the number representative of the time interval between the transmissions for this transmitter and changes the content of the frequency register according to a predetermined algorithm for this transmitter. I.e. the frequency and the time registers are updated each time a transmission is due regardless whether the transmission was received successfully. The new content of the frequency register is determined according to the algorithm for the frequency use by the transmitters.

Nominally, the time between transmission—TBT—is the same for all remote telemetry transmitters but due to unavoidable tolerances and temperature variations, the TBT may be slightly different for different transmitters and it can vary with time. Therefore, the new content of the time register is calculated based on the current content of the receiver timer and a number representative of the time between the current transmission and the next transmission for this transmitter, where this number is calculated based on the nominal value of the time between the transmissions and adjusted by a correction factor that is based on the measured difference between the transmitter time base and the time base of the receiver. The difference is computed based on the difference between the measured TBT for a transmitter and the nominal value of TBT by measuring the time of arrival of the transmissions at the receiver and comparing to the scheduled time of arrival. In the advantageous embodiment, the numbers representative of the time base differences are stored in the time registers 536 separately for each remote telemetry transmitter and are independent from the numbers representing the time of the next transmission,i.e. the time registers are split to hold two independent numbers.

Advantageously, each telemetry collection unit is furnished with a radio transmitter that is constructed in a very similar way to that described in conjunction with the remote telemetry transmitter operation. For a person skilled in the art is should be apparent what alterations may be required.

Accordingly, each transmitter of each telemetry collection unit transmits periodic messages in similar way as the remote telemetry transmitters do with the exception that the transmission period may be much shorter because the telemetry collection units are not battery operated except during power outages. In a similar way, each telemetry collection unit transmitter has an identification number as the remote telemetry transmitters do. The receivers of other telemetry collection units can receive these messages and synchronize and track the timing and frequency of all telemetry collection units within communications range. Consequently, the telemetry collection unit receiver receives messages from the transmitters of other telemetry collection unit in the same way as from the sensor-transmitters. However, the telemetry collection units are responsive in quite a different way to the messages received from the telemetry collection units' transmitters as described previously. It should now be apparent, that such arrangement does not privilege any telemetry collection unit. I.e. there is no telemetry collection unit that provides reference timing for all other telemetry collection units. As a result, the network is robust and performs its functions when one or more telemetry collection unit fails to operate correctly. At the same time, the communications between the telemetry collection units benefits from the same advantages of the frequency and time variations, i.e., immunity from interference and signal fading due to multipath propagation.

In an advantageous embodiment, the telemetry collection units assist each other in synchronization after one of them is powered down and powered up again or otherwise reset. The recently reset telemetry collection unit must have the current time and frequency information in order to track its own and other remote telemetry transmitters. Since the remote telemetry transmitters may transmit very sporadically, the acquisition time may be a considerable problem. To mitigate this problem, other telemetry collection units that are tracking some or all the transmitters that the recently recent unit needs to track, provide the recently reset unit with the needed time and frequency data relative to their own transmitter timing. Since the telemetry collection units can transmit more often and can change the rate of the transmissions as needed during the acquisition, this results in a considerable improvement in the acquisition speed. For example, the recently rest unit, in order to speed the synchronization with other telemetry collection units, starts with transmitting at a rapid pace and with longer transmission duration, thus improving the probability that at least one telemetry collection unit receiver that continuously searches all available frequencies, receives one such transmission.

In further refinement of the transmission method, the frequencies and the time intervals between transmission are varied according to sequences that are individual for each collection unit in a manner described in conjunction with remote telemetry transmitters. Similarly, the time patterns are determined individually for each transmitter based on its identification number in the same way as the frequency index, but using different bit of the transmitter identification. The produced orthogonal frequency-time hopping patters allow many remote telemetry transmitters and many telemetry collection units coexist with minimal mutual interference.

In some applications, an alarm packet can be transmitted at the next status transmission. However, in some applications, it is desirable that the intervals between status transmissions are as long as possible in battery operated transmitters. In some applications the time intervals may be as much as 100 seconds, thus at the worst case there would be a delay in the transmission of the alarm status that is a 100 seconds in such case. In some applications, such as burglary alarm systems, such a delay is not acceptable. In such a case, the transmitter might transmit repeatedly many packets in hope that the receiver that continuously scans all the frequencies eventually intercepts at least one such transmission. However, if many frequencies are used, the probability of interception may be small, thus requiring excessive number of transmissions that drains the transmitter battery.

Therefore, another method is presented to remedy this in accordance with an exemplary implementation of the present invention. Accordingly, the transmissions of alarm packets are performed at "transmission opportunities" in accordance with a method described later in details.

Figure 7:
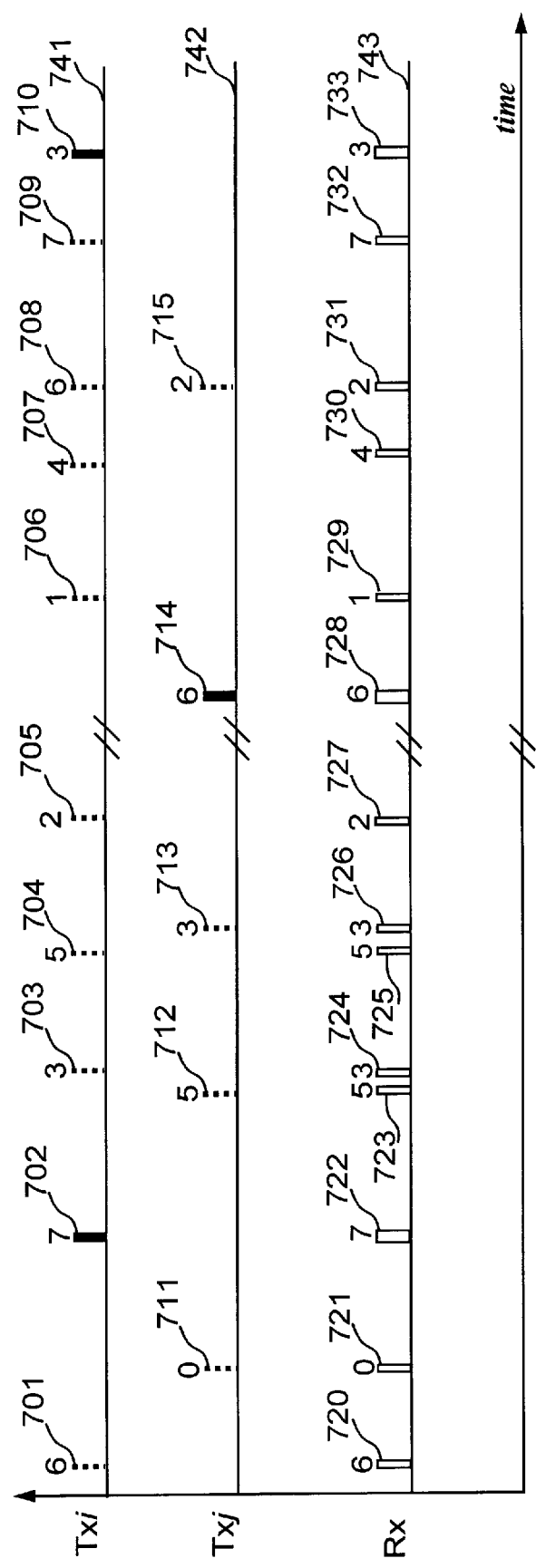
FIG. 7 is a diagram of frequency hopping transmissions including transmission opportunities for transmitting urgent messages in accordance with the illustrative implementation of the present invention.

Referring to FIG. 7, in accordance with advantageous implementation of the present invention, each transmitter establishes "transmission opportunities" between each two consecutive status transmissions. When a transmitter needs to transmit data before the next status transmission, it transmits at the next transmission opportunity. In turn, each receiver that tracks this transmitter, examines the transmission opportunities for pending transmissions. For example, while the status transmission are transmitted at 100 second intervals, the opportunities might be created at 250 ms intervals. This way the transmitter needs to wait no more than 250 ms before it can transmit a packet. Advantageously, the transmission opportunities are also determined based on time-frequency hopping sequence. This way, they experience the communications advantages of the frequency hopping technique.

For the purpose of this specification, the term "transmission opportunity" is defined as: (i) time, or (ii) frequency, or (iii) code, or (iv) any combination of (i), (ii), and (iii) at which a transmission might occur.

Accordingly, in FIG. 7, the transmitter Txi, besides transmitting status transmission 702 at frequency index 7 and 710 at frequency index 3, also establishes transmission opportunities 701, 703, 704, 705, 706, 707, 708, and 709 at frequency indexes 6, 3, 5, 2, 1, 4, 6, and 7 accordingly. Similarly, transmitter Txj transmits status transmission 714 and in addition establishes transmission opportunities 711, 712, 714, and 715 at frequency indexes 0, 5, 3, and 2 accordingly. The receiver Rx, hops to catch the status transmissions at time windows 722 and 733 from transmitter Txi and 728 from transmitter Txj. In addition, the receiver examines each transmission opportunity from each transmitter: in time windows 720, 724, 725, 727, 729, 730, and 732 from transmitter Txi, and in time windows 721, 723, 726 and 731 from transmitter Txj.

It should be pointed out that at the time window 731 there exist two opportunities: one established by transmitter Txi at frequency 6, the other established by transmitter Txj at frequency 2. The receiver must arbitrate which opportunity to examine, for example, based on the past examined opportunities or probability of traffic from each transmitter. Alternatively, the receiver might be equipped with two or more circuits to receive at more than one frequency at the same time.

In accordance with another aspect of an advantageous implementation, the time-frequency patterns of the transmission opportunities and the status transmissions are related. Again, referring to FIG. 7, the frequency sequence used by the transmitter Txi is { . . . 6, 7, 3, 5, 2, 1, 4, 6, 7, . . . }. The status transmission occurs at frequency 7, after which the next frequency is used for the next transmission opportunity. This way, the basic sequence is used for both the transmission opportunities and the status transmissions. The status transmission frequencies are established simply by decimating the basic sequence. In this regard, a status transmission appears at one of the transmission opportunities.

In general, if the basic sequence length is N, and the status transmissions are performed every M*N+1 transmission opportunities, then the status transmissions will occur at the same frequency pattern as that established by the basic sequence.

In a similar way, the time hopping is introduced into the transmission opportunities. The time hoping advantage is evidenced by the preceding example of temporal coincidence of two opportunities. The coincidence was not present at the next opportunity due to the time hopping.

Although there might be developed several ways of establishing the time-frequency hopping along with ways for relating the transmission opportunities and status transmissions, the decimation method is advantageous for its elegance and ease of implementation.

In the illustrative embodiment described here, references are made to several elements such as generators, logic, registers, control operations, etc. It is to be understood that various elements described here can be realized in several different forms including software and hardware in their various forms and combinations. E.g. the "logic" can be a hardware such as a gate or memory element, or it can be a piece of software to perform a certain task. In the later case, logic simply means "intelligence".

Although illustrative embodiments of the invention have been described in detail herein with reference to the accompanying drawings, it is to be understood that the invention is not limited to those precise embodiments, and that various changes and modifications can be effected therein by one skilled in art without departing from the scope and spirit of the invention as defined by the appended claims.

What is claimed is:

1. An apparatus comprising:
   (1) a first telemetry collection unit comprising:
      (i) a first receiver for receiving telemetry from each of a first plurality of remote telemetry transmitters that is associated with said first telemetry collection unit and for receiving messages from a second telemetry collection unit, wherein said first receiver comprises logic for holding data indicative of an expected time and an expected frequency of at least one future transmission from each of said first plurality of remote telemetry transmitters, and
      (ii) a first transmitter, and
   (2) a second telemetry collection unit comprising:
      (i) a second receiver for receiving telemetry from each of a second plurality of remote telemetry transmitters that is associated with said second telemetry collection unit and for receiving messages from said first telemetry collection unit, wherein said second receiver comprises logic for holding data indicative of an expected time and an expected frequency of at least one future transmission from each of said second plurality of remote telemetry transmitters, and
      (ii) a second transmitter; wherein each of said remote telemetry transmitters is for transmissions at varied frequencies independently of any other of said remote telemetry transmitters and independently of any of said telemetry collection units.

2. The apparatus of claim 1 wherein:
   said first and said second transmitter transmit at varied frequencies; and
   said first receiver includes logic for holding data indicative of an expected time and an expected frequency of at least one future transmission from said second telemetry collection unit, and
   said second receiver includes logic for holding data indicative of an expected time and an expected frequency of at least one future transmission from said first telemetry collection unit.

3. The apparatus of claim 1 wherein:
   said first transmitter is for transmitting, to said second telemetry collection unit, an identification code that is associated with at least one of said first plurality of remote telemetry transmitters, and
   said second transmitter is for transmitting, to said first telemetry collection unit, an identification code that is associated with at least one of said second plurality of remote telemetry transmitters, and
   said first receiver comprises logic for holding data indicative of an expected time and an expected frequency of at least one future transmission from said at least one of said second plurality of remote telemetry transmitters, and
   said second receiver comprises logic for holding data indicative of an expected time and an expected frequency of at least one future transmission from said at least one of said first plurality of remote telemetry transmitters.

4. The apparatus of claim 1 wherein:
   said first transmitter is for transmitting, to said second telemetry collection unit, at least part of data indicative of an expected time and an expected frequency that is held in said first receiver, and
   said second transmitter is for transmitting, to said first telemetry collection unit, at least part of data indicative of an expected time and frequency that is held in said second receiver.

5. The apparatus of claim 1 further comprising:
   at least one of: (a) a first network interface unit operatively coupled to said first telemetry collection unit, and (b) a second network interface unit operatively coupled to said second telemetry collection unit.

6. The apparatus of claim 1 further comprising:
   (3) a third telemetry collection unit comprising:
      (i) a third receiver for receiving telemetry from each of a third plurality of remote telemetry transmitters that is associated with said third telemetry collection unit, wherein said third receiver comprises logic for holding data indicative of an expected time and an expected frequency of at least one future transmission from each of said third plurality of remote telemetry transmitters, and wherein each of said third plurality of remote telemetry transmitters is for transmissions at varied frequencies independently of any other of said remote telemetry transmitters and independently of any of said telemetry collection units, (ii) a third transmitter for transmitting an alarm to said second telemetry collection unit, and wherein said second telemetry collection unit, when operative, forwards said alarm to said first telemetry collection unit.

7. The apparatus of claim 6 wherein:

said second receiver comprises logic for holding data indicative of an expected time and an expected frequency of at least one future transmission from at least one of said third plurality of remote telemetry transmitters, and said second receiver, when operative, receives an alarm from said at least one of said third plurality of remote telemetry transmitters, and said second telemetry collection unit, when operative, forwards said alarm to said first telemetry collection unit.

8. A method comprising:

holding, at a first telemetry collection unit, data indicative of an expected time and an expected frequency of at least one future transmission from each of a first plurality of remote telemetry transmitters that is associated said first telemetry collection unit, and receiving, at said first telemetry collection unit, telemetry from each of said first plurality of remote telemetry transmitters, and receiving, at said first telemetry collection unit, messages from a second telemetry collection unit; and holding, at said second telemetry collection unit, data indicative of an expected time and an expected frequency of at least one future transmission from each of a second plurality of remote telemetry transmitters, and receiving, at said first telemetry collection unit, telemetry from each of said second plurality of remote telemetry transmitters, and receiving, at said second telemetry collection unit, messages from said first telemetry collection unit, and transmitting, at each of said remote telemetry transmitters, at varied frequencies independently of any other of said remote telemetry transmitters and independently of any of said telemetry collection units.

9. The method of claim 8 further comprising:

transmitting at varied frequencies from said first telemetry collection unit, and holding, at said second telemetry collection unit, data indicative of an expected time and an expected frequency of at least one future transmission from said first telemetry collection unit, and transmitting at varied frequencies from said second telemetry collection unit, and holding, at said first telemetry collection unit, data indicative of an expected time and an expected frequency of at least one future transmission from said second telemetry collection unit.

10. The method of claim 8 further comprising:

transmitting, from said first telemetry collection unit to said second telemetry collection unit, an identification code that is associated with at least one of said first plurality of remote telemetry transmitters, and holding, at said second telemetry collection unit, data indicative of an expected time and frequency of at least one future transmission from said at least one of said first plurality of remote telemetry transmitters, and transmitting, from said second telemetry collection unit to said first telemetry collection unit, an identification code that is associated with at least one of said second plurality of remote telemetry transmitters; and holding, at said first telemetry collection unit, data indicative of an expected time and frequency of at least one future transmission from said at least one of said second plurality of remote telemetry transmitters.

11. The method of claim 8 further comprising:

transmitting, by said first telemetry collection unit to said second telemetry collection unit, at least part of data indicative of an expected time and an expected frequency that is held in said first telemetry collection unit, and transmitting, by said second telemetry collection unit to said first telemetry collection unit, at least part of data indicative of an expected time and an expected frequency that is held in said second telemetry collection unit.

12. The method of claim 8 further comprising at least one of:

(a) transmitting via a first network interface unit from said first telemetry collection unit, and (b) transmitting via a second network interface unit from said second telemetry collection unit.

13. The method of claim 8 further comprising:

holding, at a third telemetry collection unit, data indicative of an expected time and an expected frequency of at least one future transmission from each of a third plurality of remote telemetry transmitters that is associated said third telemetry collection unit, and receiving at said third telemetry collection unit telemetry from each of said third plurality of remote telemetry transmitters; and transmitting an alarm from said third telemetry collection unit to said second telemetry collection unit; and transmitting said alarm form said second telemetry collection unit to first said telemetry collection unit.

14. The method of claim 8 further comprising:

holding at said second telemetry collection unit, data indicative of an expected time and frequency of at least one future transmission from at least one of a third plurality of remote telemetry transmitters that is associated with a third telemetry collection unit, and receiving an alarm at said second telemetry unit from said at least one of said third plurality of remote telemetry transmitters, and forwarding said alarm from said second telemetry collection unit to said first telemetry collection unit.

15. A telemetry collection unit comprising:

(i) a receiver for receiving telemetry from a first plurality of remote telemetry transmitters that is associated with said telemetry collection unit and for receiving an alarm from a second telemetry collection unit, wherein (a) each of said remote telemetry transmitters is for transmissions at varied frequencies at its own pace independently of any other of said remote telemetry transmitters and independently of any of said telemetry collection units, and wherein (b) said receiver comprises logic for holding data indicative of an expected time and an expected frequency of at least one future transmission from each of said first plurality of remote telemetry transmitters; and (ii) a transmitter for forwarding said alarm to at least one third telemetry collection unit.

16. The telemetry collection unit of claim 15 wherein said transmitter transmits at varied frequencies, and said receiver includes logic for holding data indicative of an expected time and an expected frequency of at least one future transmission from at least one other telemetry collection unit.

17. The telemetry collection unit of claim 15 wherein said receiver is for receiving a second alarm from at least one of a second plurality of remote telemetry transmitters that is associated with said second telemetry collection unit; and said transmitter is for forwarding said second alarm to at least one third telemetry collection unit; wherein said receiver further comprises logic for holding data indicative of an expected time and an expected frequency of at least one future transmission from said at least one of said second plurality of remote telemetry transmitters, and each of said second plurality of remote telemetry transmitters is for transmissions at varied frequencies at its own pace independently of any other of said remote telemetry transmitters and independently of any of said telemetry collection units.

18. The telemetry collection unit of claim 15 wherein said receiver is for receiving, from a second telemetry collection unit, an identification code of at least one of a second plurality of remote telemetry transmitter that is associated with said second telemetry collection unit; and said transmitter is for transmitting an identification code of at least one of said first plurality remote telemetry transmitters to at least one other telemetry collection unit.

19. The telemetry collection unit of claim 15 wherein an alarm transmitted by said telemetry collection unit comprises an identification code for distinguishing alarms originated from different sources and at different instances.

20. The telemetry collection unit of claim 15 wherein said transmitter is for transmitting at least part of data indicative of an expected time and an expected frequency that is held by said receiver to at least one other telemetry collection unit.

21. The telemetry collection unit of claim 15 wherein:

said telemetry collection unit is operatively coupled to a network interface unit to forward said alarm to a central monitoring facility.

22. A method of operating a telemetry collection unit comprising:

holding data indicative of an expected time and an expected frequency of at least one future transmission from each of a first plurality of remote telemetry transmitters that is associated with said telemetry collection unit, wherein each of said first plurality of remote telemetry transmitters is for transmissions at varied frequencies at its own pace independently of any other of said remote telemetry transmitters and independently of said telemetry collection unit, and receiving telemetry from each of said first plurality of remote telemetry transmitters in accordance with said data, and receiving an alarm from a second telemetry collection unit; and forwarding said alarm to at least one third telemetry collection unit.

23. The method of claim 22 further comprising:

transmitting from said telemetry collection unit at varied frequencies, and holding, at said telemetry collection unit, data indicative of an expected time and frequency of at least one future transmission from at least one other telemetry collection unit.

24. The method of claim 22 further comprising:

holding data indicative of an expected time and an expected frequency of at least one future transmission from at least one of a second plurality of remote telemetry transmitters that is associated with said second telemetry collection unit, and receiving a second alarm from said at least one of said second plurality of remote telemetry transmitters; and forwarding said second alarm to at least one third telemetry collection unit; wherein each of said second plurality of remote telemetry transmitters is for transmissions at varied frequencies at its own pace independently of any other of said remote telemetry transmitters and independently of any of said telemetry collection units.

25. The method of claim 22 further comprising:

receiving, from said second telemetry collection unit, an identification code of at least one of a second plurality of remote telemetry transmitter that is associated with said second telemetry collection unit; and transmitting an identification code of at least one of said first plurality remote telemetry transmitters to at least one other telemetry collection unit.

26. The method of claim 22 further comprising:

including in an alarm transmitted by said telemetry collection unit an identification code for distinguishing alarms originated from different sources and at different instances.

27. The method of claim 22 further comprising:

transmitting, by said telemetry collection unit, at least part of data indicative of an expected time and frequency that is held by said telemetry collection unit to at least one other telemetry collection unit.

28. The method of claim 22 further comprising:

forwarding said alarm to a central monitoring facility using a network interface unit.

* * * * *